(12) United States Patent
Laughton et al.

(10) Patent No.: US 11,860,811 B2
(45) Date of Patent: Jan. 2, 2024

(54) MESSAGE PROTOCOL FOR A DATA PROCESSING SYSTEM

(71) Applicant: Arm Limited, Cambridge (GB)

(72) Inventors: Arthur Brian Laughton, Hathersage (GB); Tessil Thomas, Cambridge (GB); Jacob Joseph, Rotherham (GB)

(73) Assignee: Arm Limited, Cambridge (GB)

(*) Notice: Subject to any disclaimer, the term of this patent is extended or adjusted under 35 U.S.C. 154(b) by 15 days.

(21) Appl. No.: 17/702,651

(22) Filed: Mar. 23, 2022

(65) Prior Publication Data

US 2023/0305985 A1    Sep. 28, 2023

(51) Int. Cl.
*G06F 13/42*    (2006.01)
*G06F 13/16*    (2006.01)
*G06F 13/40*    (2006.01)

(52) U.S. Cl.
CPC ...... *G06F 13/4221* (2013.01); *G06F 13/1668* (2013.01); *G06F 13/4059* (2013.01); *G06F 13/4063* (2013.01)

(58) Field of Classification Search
CPC ............. G06F 13/4221; G06F 13/1668; G06F 13/4059; G06F 13/4063
See application file for complete search history.

(56) References Cited

U.S. PATENT DOCUMENTS

| | | | |
|---|---|---|---|
| 11,074,206 B1* | 7/2021 | Jalal ................... | G06F 13/4013 |
| 2009/0198885 A1* | 8/2009 | Manoj ................ | G06F 11/1076 |
| | | | 711/E12.001 |
| 2010/0250891 A1* | 9/2010 | Shalev ................. | G06F 3/0611 |
| | | | 711/170 |
| 2016/0350010 A1* | 12/2016 | Ryan .................... | G06F 3/0619 |
| 2016/0357462 A1* | 12/2016 | Nam .................... | G06F 3/0613 |
| 2018/0232181 A1* | 8/2018 | Zhou .................... | G06F 3/0611 |
| 2022/0100411 A1* | 3/2022 | Donley ................ | G06F 3/0655 |
| 2022/0222011 A1* | 7/2022 | Choi .................... | G06F 3/0659 |
| 2023/0138290 A1* | 5/2023 | Ahmed .................. | G06F 9/505 |
| | | | 711/154 |

* cited by examiner

*Primary Examiner* — Phong H Dang
(74) *Attorney, Agent, or Firm* — Leveque Intellectual Property Law, P.C.

(57) ABSTRACT

The present disclosure provides a system and methods for transferring data across an interconnect. One method includes, at a request node, receiving, from a source high speed serial controller, a write request from a source, dividing the write request into sequences of smaller write requests each having a last identifier, and sending, to a home node, the sequences of smaller write requests; and, at the home node, sending, to a destination high speed serial controller, the sequences of smaller write requests for assembly into intermediate write requests that are transmitted to a destination. Each sequence of smaller write requests is assembled into an intermediate write request based on the last identifier.

18 Claims, 7 Drawing Sheets

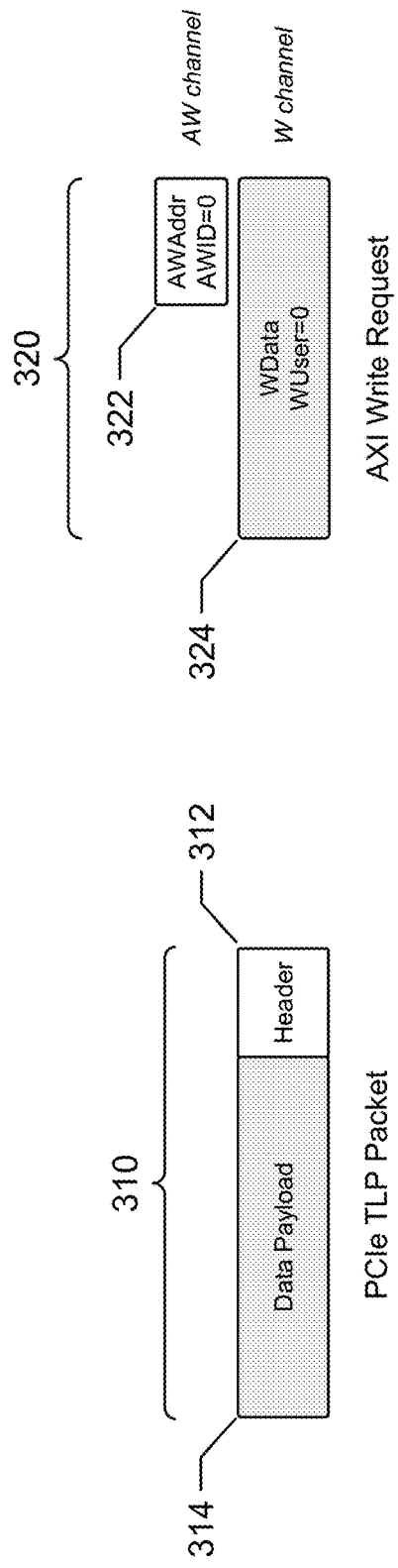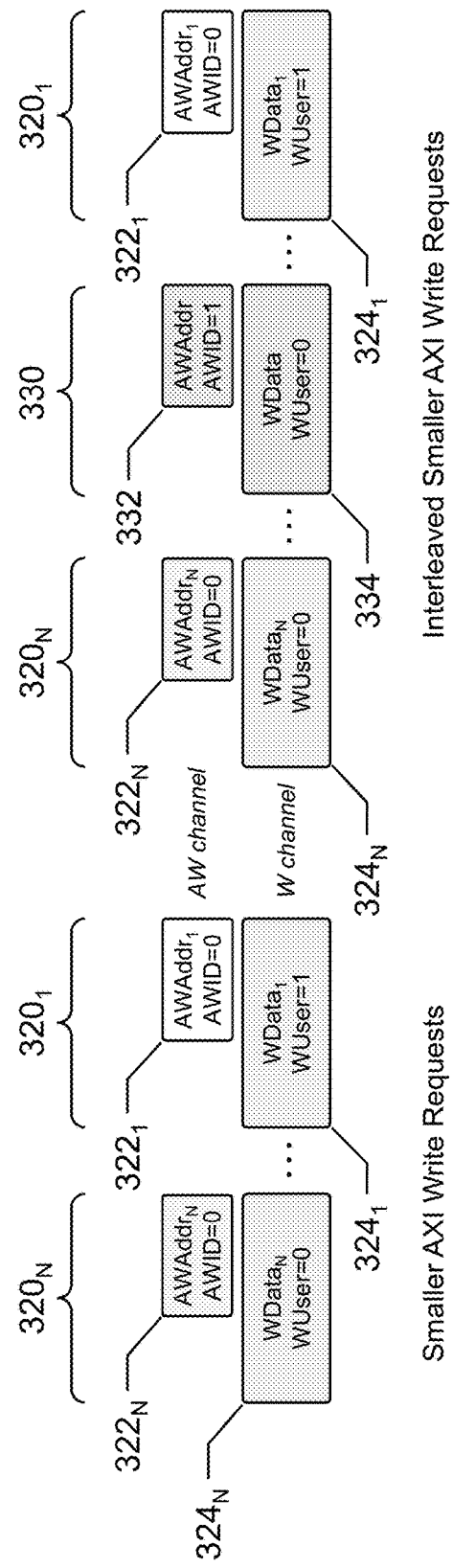

MESSAGE PROTOCOL FOR A DATA PROCESSING SYSTEM

BACKGROUND

The present disclosure relates to a data processing system. More particularly, the present disclosure relates to a message protocol for a data processing system.

A data processing system may be arranged as a system-on-chip (SoC) that includes various components that are connected by an interconnect. Generally, certain components process data, such as, for example, processors, processor clusters, graphic processors, etc., while other components send data to, and receive data from, the data processing components, such as, for example, memory controllers, input/output (I/O) controllers such as serial and high-speed serial (HSS) data bus or HSS network controllers, other network controllers, etc. The data provisioning components may be connected to on-chip or off-chip memory, data buses and networks, wired or wireless networks, etc. The interconnect provides the network infrastructure over which data transactions between components are conveyed.

An interconnect may implement packet-based communication with a request-response message protocol. Generally, a requester is a component that initiates a transaction or request over the interconnect, and a completer is a component that responds to the request over the interconnect. Additionally, the requester may receive the request from a source device that is connected to the requester, and the completer may send the request to a destination device that is connected to the completer.

In this interconnect, if the transaction size of a request from the source device to the requester is larger than the maximum transaction size that is supported by the interconnect, the requester divides the request into several, smaller requests that are transmitted across the interconnect to the completer. The completer then issues a separate request to the destination device for each smaller request that is received from the requester over the interconnect. Unfortunately, this limitation significantly reduces efficiency, performance and throughput, and increases message header overhead for requesters, completers and destination devices.

BRIEF DESCRIPTION OF THE DRAWINGS

FIG. 2A depicts a PCIe transaction layer protocol packet, in accordance with an embodiment of the present disclosure.

FIG. 2B depicts an AXI write request, in accordance with an embodiment of the present disclosure.

FIG. 2C depicts smaller AXI write requests, in accordance with an embodiment of the present disclosure.

FIG. 2D depicts smaller AXI write requests interleaved with an AXI write request, in accordance with an embodiment of the present disclosure.

DETAILED DESCRIPTION

Figure 1A:
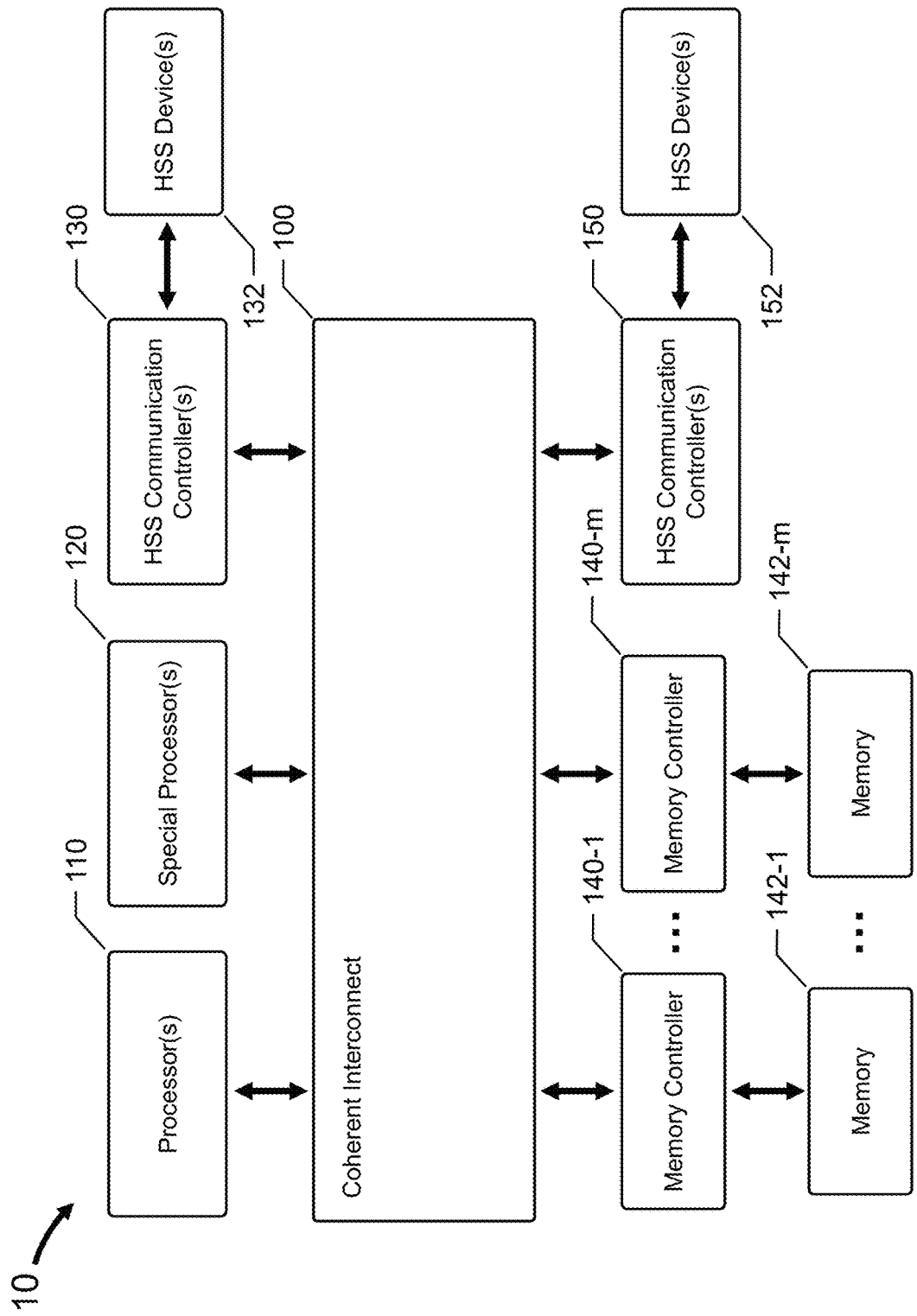
FIG. 1A depicts a block diagram for a SoC, in accordance with an embodiment of the present disclosure.

Embodiments of the present disclosure will now be described with reference to the drawing figures, in which like reference numerals refer to like parts throughout.

Embodiments of the present disclosure advantageously provide a high efficiency message protocol for a data processing system that includes high speed communication buses and networks that are connected to an interconnect. While applicable to many message protocols that may pass through an interconnect, embodiments of the present disclosure particularly improve the efficiency of peripheral component interconnect express (PCIe) peer-to-peer transactions that are fragmented by the interconnect during transmission, and the like, as discussed in detail below.

In one embodiment, a system includes a destination high speed serial (HSS) controller including a processor configured to receive sequences of smaller write requests from an interconnect, where the sequences of smaller write requests are generated from a larger write request from a source, the larger write request has a data size, and each smaller write request has a last identifier and a data size. For each sequence of smaller write requests, the processor is configured to assemble, based on the last identifier, the smaller write requests into an intermediate write request having a data size, and to send the intermediate write request to a destination.

Generally, a SoC interconnect may be coupled to an HSS bus or network via a controller, such as, for example, a PCIe controller, a compute express link (CXL) controller, etc., and may be required to efficiently convey traffic between source and destination endpoints that are located on different HSS buses and networks, such as, for example, graphics processing units (GPUs), memories, etc. The protocols used by these HSS buses and networks achieve higher performance with larger packet sizes. For example, the PCIe protocol allows payload sizes up to 4 KB (i.e., 4,096 bytes), which is due, in part, to the transaction header using the same channel as the write data.

Typically, a SoC interconnect uses an internal communication protocol that is optimized for cache line-sized transactions, such as, for example, AXI (described below). This communication protocol transports header information and payload data on separate channels, and uses a much smaller packet size than HSS buses and networks, such as, for example, 64 B. Unfortunately, this packet size mismatch introduces inefficiencies when the SoC interconnect conveys traffic between source and destination endpoints that are located on different HSS buses and networks that are coupled to the SoC interconnect.

FIG. 1A depicts a block diagram for SoC 10, in accordance with an embodiment of the present disclosure.

In this embodiment, SoC 10 includes interconnect 100 coupled to processor(s) 110, accelerator(s) or special processor(s) 120, high speed serial (HSS) communication controller(s) 130 coupled to HSS device(s) 132, memory controller(s) 140 coupled to memory(ies) 142, and HSS communication controller(s) 150 coupled to HSS device(s) 152. A number, m, of memory controllers 140 are depicted in FIG. 1A, i.e., memory controllers 140-1, . . . , 140-*m*, and each memory controller 140-1, . . . , 140-*m* is coupled to a respective memory 142-1, . . . , 142-*m*, which may be integrated on SoC 10 or externally connected.

Interconnect 100 is a communication system that transfers data between processor 110, accelerator or special processor 120, HSS communication controller 130 and HSS device 132, memory controllers 140-1, ..., 140-m and memories 142-1, ..., 142-m, HSS communication controllers 150 and HSS device 152, as well as other components. Certain components of SoC 10 may be classified as a particular type of interconnect protocol node, as discussed in more detail below.

Generally, interconnect 100 may include, inter alia, a shared or hierarchical bus, a crossbar switch, a packet-based network-on-chip (NoC), etc. In one embodiment, interconnect 100 has a crossbar topology that provides an ordered network with low latency, and may be particularly suitable for a small-sized interconnect with a small number of protocol nodes, switches and wire counts. In another embodiment, interconnect 100 has a ring topology that balances wiring efficiency with latency, which increases linearly with the number of protocol nodes, and may be particularly suitable for a medium-sized interconnect. In a further embodiment, interconnect 100 has a mesh topology that has more wires to provide greater bandwidth, is modular and easily scalable by adding more rows and columns of switches or routers, and may be particularly suitable for a large-sized interconnect.

In many embodiments, interconnect 100 is a coherent mesh network that includes multiple switches or router logic modules (routers) arranged in a two-dimensional rectangular mesh topology, such as, for example, the Arm CoreLink Coherent Mesh Network. In this example, the switches or routers are crosspoints (i.e., XPs). Each XP may connect up to four neighboring XPs using mesh ports, and may connect to one or two components (devices) using device ports. Additionally, each XP may support four coherent hub interface (CHI) channels to transport data from a source device to a destination or target device, as described, for example, in the Arm Advanced Microcontroller Bus Architecture (AMBA) CHI specification.

In these embodiments, interconnect 100 may have an architecture that includes three layers, i.e., an upper protocol layer, a middle network layer, and a lower link layer. The protocol layer generates and processes requests and responses at the protocol nodes, defines the permitted cache state transitions at the protocol nodes that include caches, defines the transaction flows for each request type, and manages the protocol level flow control. The network layer packetizes the protocol message, determines, and adds to the packet, the source and target node IDs required to route the packet over interconnect 100 to the required destination. The link layer provides flow control between components, and manages link channels to provide deadlock free switching across interconnect 100.

Processor 110 is a general-purpose, central processing unit (CPU) that executes instructions to perform various functions for SoC 10, such as, for example, control, computation, input/output, etc. More particularly, processor 110 may include a single processor core or multiple processor cores, which may be arranged in a processor cluster, such as, for example the Arm Cortex A, R and M families of processors. Generally, processor 110 may execute computer programs or modules, such as an operating system, application software, other software modules, etc., stored within a memory, such as, for example, memory 142-1, ..., memory 142-m, etc. Processor 110 may also include local cache memory.

Accelerator or special processor 120 is a specialized processor that is optimized to perform a specific function, such as process graphics, images and/or multimedia data, process digital signal data, process artificial neural network data, etc. For example, accelerator or special processor 120 may be a GPU, an neural processing unit (NPU), a digital signal processor (DSP), etc. More particularly, accelerator or special processor 120 may include a single processor core or multiple processor cores, such as, for example the Arm Mali family of GPUs, display processors and video processors, the Arm Machine Learning processor, etc. Accelerator or special processor 120 may also include local cache memory.

Memory controllers 140-1, ..., 140-m include a microprocessor, microcontroller, application specific integrated circuit (ASIC), field programmable gate array (FPGA), etc., and are configured to provide access to memories 142-1, ..., 142-m through interconnect 100. Memories 142-1, ..., 142-m may include a variety of non-transitory computer-readable medium that may be accessed by the other components of SoC 10, such as processor 110, accelerator or special processor 120, etc. For example, memory 142-1 may store data and instructions for execution by processor 110, accelerator or special processor 120, etc.

In various embodiments, memories 142-1, ..., 142-m may include volatile and nonvolatile medium, non-removable medium and/or removable medium. For example, memories 142-1, ..., 142-m may include any combination of random access memory (RAM), dynamic RAM (DRAM), double data rate (DDR) DRAM or synchronous DRAM (SDRAM), static RAM (SRAM), read only memory (ROM), flash memory, cache memory, and/or any other type of non-transitory computer-readable medium. In certain embodiments, memory controllers 140-1, ..., 140-m are dynamic memory controllers that provide data transfers to and from high-density DDR3 or DDR4 DRAM memory, such as, for example, the Arm CoreLink Dynamic Memory Controller (DMC) family, each of which includes a fast, single-port CHI channel interface for connecting to interconnect 100.

Generally, HSS communication controllers 130, 150 each include a microprocessor, microcontroller, ASIC, FPGA, etc., communicate with interconnect 100 using one or more AMBA connections with advanced extensible interface (AXI) and/or AXI Coherency Extensions (ACE) Lite protocols, and communicate with HSS devices 132, 152 (respectively) using an HSS communications interface, such as, for example, PCIe, CXL, Ethernet, high-definition multimedia interface (HDMI), Thunderbolt, universal serial bus (USB), serial attached SCSI (SAS), serial advanced technology attachment (SATA), etc.

Figure 1B:
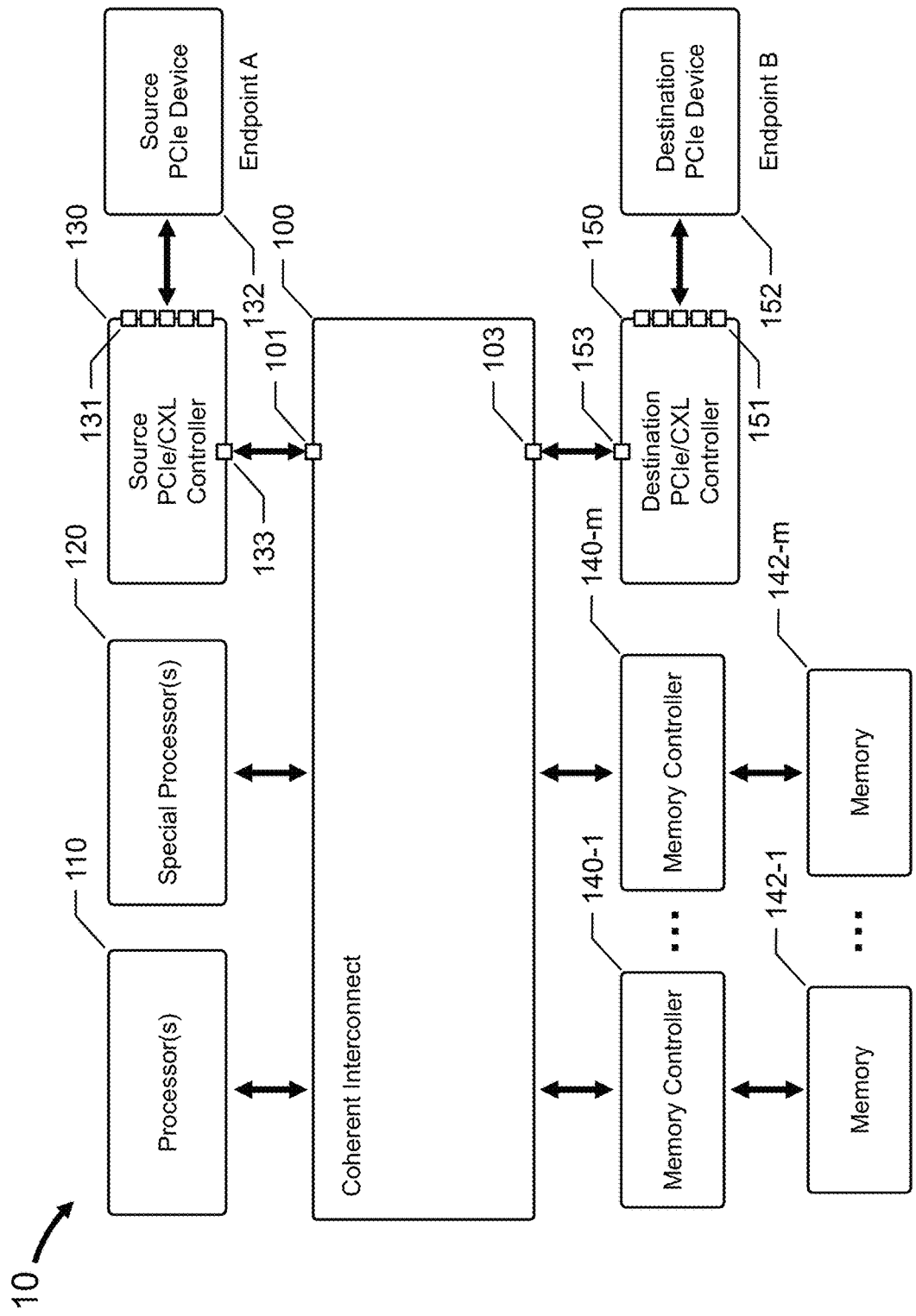
FIG. 1B depicts a block diagram for a SoC, in accordance with an embodiment of the present disclosure.

FIG. 1B depicts a block diagram for SoC 10, in accordance with an embodiment of the present disclosure.

As depicted in FIG. 1B, in many embodiments, HSS communication controller 130 is a source PCIe/CXL controller 130, HSS devices 132 are source PCIe devices 132, HSS communication controller 150 is a destination PCIe/CXL controller 150, and HSS devices 152 are destination PCIe devices 152.

Source PCIe/CXL controller 130 includes a microprocessor, microcontroller, ASIC, FPGA, etc., a number of PCIe ports 131 and one or more interconnect interfaces 133. Each PCIe port 131 may be coupled to a different source PCIe device 132, and communicates therewith using a PCIe connection. Source PCIe/CXL controller 130 is configured to provide the functionality of a PCIe root complex, and implements a controller instance for each PCIe port 131. Each interconnect interface 133 is coupled to an interface 101 of interconnect 100, and communicates with the interconnect 100 using an AMBA connection with AXI and/or ACE Lite protocols.

Similarly, destination PCIe/CXL controller 150 includes a microprocessor, microcontroller, ASIC, FPGA, etc., a number of PCIe ports 151 and one or more interconnect interfaces 153. Each PCIe port 151 may be coupled to a different destination PCIe device 152, and communicates therewith using a PCIe connection. Destination PCIe/CXL controller 150 is configured to provide the functionality of a PCIe root complex, and implements a controller instance for each PCIe port 151. Each interconnect interface 153 is coupled to an interface 103 of interconnect 100, and communicates with the interconnect 100 using an AMBA connection with AXI and/or ACE Lite protocols.

Generally, source PCIe devices 132 and destination PCIe devices 152 exchange PCIe peer-to-peer traffic through source PCIe/CXL controller 130, interconnect 100, and destination PCIe/CXL controller 150. In the embodiment depicted in FIG. 1B, source PCIe device 132 (endpoint A) exchanges PCIe peer-to-peer traffic with destination PCIe device 152 (endpoint B).

Figure 1C:
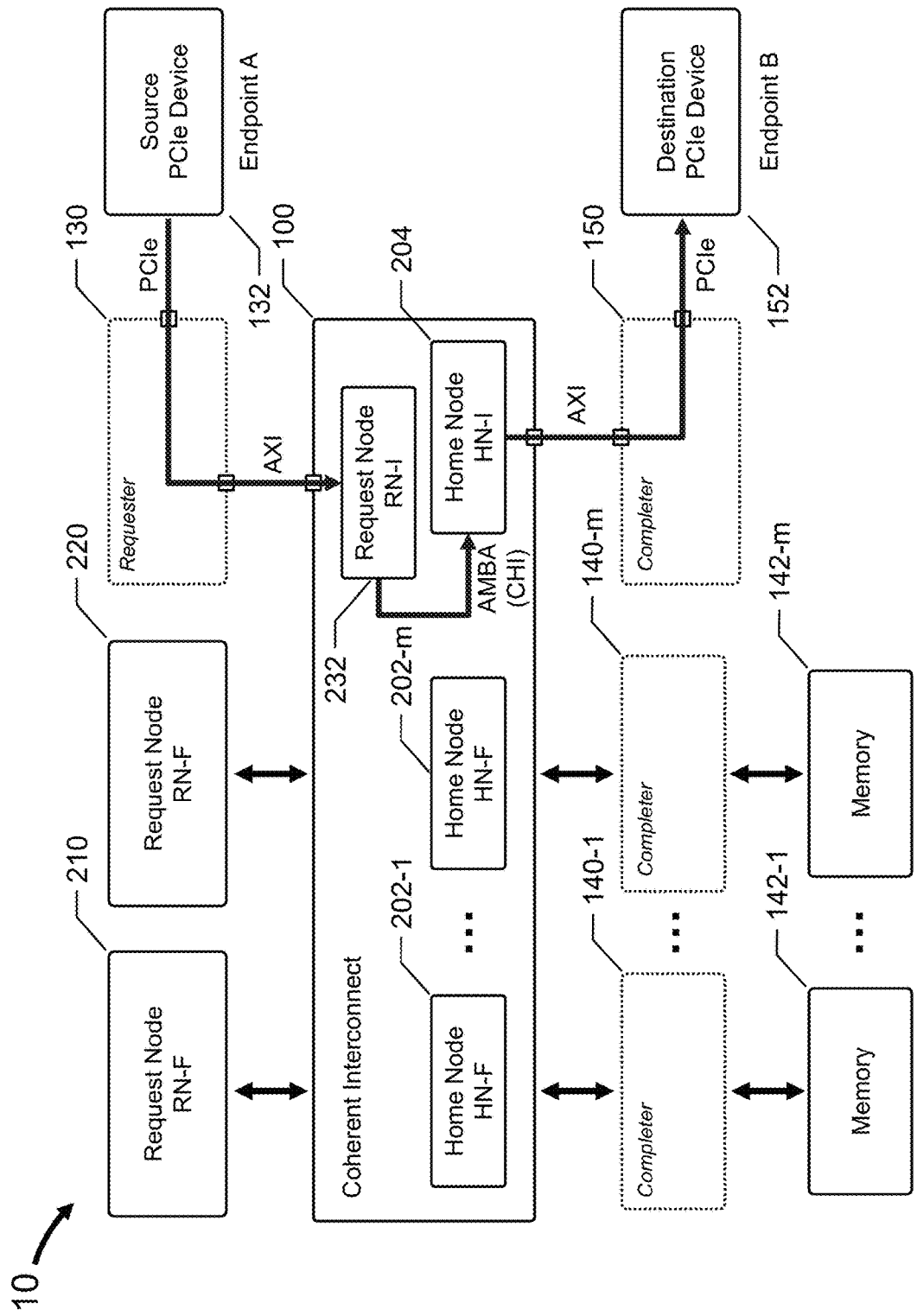
FIG. 1C depicts a block diagram for a SoC using protocol node nomenclature, in accordance with an embodiment of the present disclosure.

FIG. 1C depicts a block diagram for SoC 10 using protocol node nomenclature, in accordance with an embodiment of the present disclosure.

A requester is represented by a Request Node (RN), which is a protocol node that generates protocol transactions for interconnect 100, such as, for example, memory reads and writes, I/O data transfers, etc. An RN-F protocol node represents a "fully" coherent requester, and an RN-I protocol node represents an "I/O" coherent requester. Processor 110 and accelerator or special processor 120 are fully coherent requesters, so RN-F 210 represents processor 110, and RN-F 220 represents accelerator or special processor 120. Each RN-I represents a source device that is connected to source PCIe/CXL controller 130, and includes a microprocessor, microcontroller, ASIC, FPGA, logic circuits, etc., to provide the relevant functionality. In some embodiments, RN-Is may use the same hardware. Source PCIe device 132 is an I/O coherent requester, so RN-I 232 represents source PCIe device 132. In this embodiment, source PCIe/CXL controller 130 acts as a bridge from RN-I 232 to source PCIe device 132.

In this embodiment, interconnect 100 includes several completers, each including a microprocessor, microcontroller, ASIC, FPGA, logic circuits, etc., to provide the relevant functionality. Each completer is represented by a Home Node (HN), which is a protocol node that receives protocol transactions from RNs, and may receive protocol transactions from completers (e.g., memory controllers, etc.), as described below. Each HN is responsible for managing a specific portion of the overall address space for SoC 10. Similar to RNs, an HN-F protocol node represents a fully coherent completer, and an HN-I protocol node represents an I/O coherent completer.

In many embodiments, the entire address space of memories 142-1, . . . , 142-m may be managed by the HN-Fs 202-1, . . . , 202-m in SoC 10. Each HN-F may include a system level cache and a snoop traffic filter, and acts as the Point-of-Coherency (PoC) and Point of Serialization (PoS) for the memory requests sent to that HN-F. To avoid conflicts when multiple RNs attempt to access the same memory address within memories 142-1, . . . , 142-m, HN-Fs 202-1, . . . , 202-m act as the PoS, processing read requests, write requests, etc., in a serial manner. A fully coherent destination device may be represented by a completer, which is a protocol node that receives and completes requests from the HN-Fs. Memory controllers 140-1, . . . , 140-m are fully coherent destination devices.

Each HN-I is responsible for managing all of the transactions targeting the address space of a destination device or subsystem, and acts as the Point-of-Coherency (PoC) and Point of Serialization (PoS) for the requests sent to that destination device. Destination PCIe device 152 is a destination device, so HN-I 204 manages the address spaces for destination PCIe device 152. In certain embodiments, source PCIe device 132 is a master device, and destination PCIe device 152 is a slave device.

PCIe peer-to-peer (P2P) traffic includes posted and non-posted transactions, such as, for example, read transactions, write transactions, etc., that include requests and may include completions or responses. A posted transaction includes a request that does not require a completion or response, while a non-posted transaction includes a request that does require a completion or response. Posted write transactions follow Ordered Write Observation (OWO) to maintain PCIe ordering rules.

FIG. 2A depicts a PCIe transaction layer protocol (TLP) packet 310, in accordance with an embodiment of the present disclosure.

PCIe TLP packet 310 includes header 312 and data payload 314, which may include a read request, a read response, a write request, a write response, etc. For a write transaction, source PCIe device 132 (endpoint A) generates a PCIe TLP packet 310 that includes data payload 314 with a write request that includes the write address and the write data, and then transmits the PCIe TLP packet 310 to source PCIe/CXL controller 130 over a PCIe network. Source PCIe/CXL controller 130 converts the PCIe TLP packet 310 to an AXI write request, which is transmitted to interconnect 100 over an AMBA connection with AXI protocol.

FIG. 2B depicts an AXI write request 320, in accordance with an embodiment of the present disclosure.

AXI write request 320 includes write address channel data 322 transmitted over the write address (AW) channel, and write data channel data 324 transmitted over the write data (W) channel. Write address channel data 322 includes, inter alia, the write address from data payload 314 (i.e., AWAddr) and an AWID signal set to 0, while the write data channel data 324 includes the write data from data payload 314 (i.e., WData) and a WUser signal set to 0. The corresponding AXI write response, if required, includes write response channel data transmitted over the write response (B) channel, such as, for example, BResp, etc.

The AXI write request 320 is received and processed by RN-I 232, transmitted through interconnect 100 to HN-I 204 according to the AMBA CHI protocol, and then transmitted to destination PCIe/CXL controller 150 over an AMBA connection with AXI protocol. Destination PCIe/CXL controller 150 converts the AXI write request 320 into a PCIe TLP packet 310, and then transmits the PCIe TLP packet 310 to destination PCIe device 152 (endpoint B) over a different PCIe network. In some cases, destination PCIe device 152 generates a write response, which is transmitted to source PCIe device 132 along a similarly route in the other direction.

Typically, PCIe device 132 (endpoint A) originates a write request that includes write data that exceed the amount of data (i.e., the data size) that can be transmitted over interconnect 100 in a single AXI write request 320. So, RN-I 232 divides or fragments the write request into a number of smaller AXI write requests $320_1, \ldots, 320_N$ that each satisfy the AMBA CHI protocol, which are then transmitted to HN-I 204. In many embodiments, the amount of write data that can be transmitted over interconnect 100 in a single AXI write request 320 is 64 B, so RN-I 232 divides or fragments the write request into a number of smaller AXI write requests $320_i$, each having a 64 B data size. For example, if the write request has a data size of 4 KB, then RN-I 232 divides or fragments the write request into 64 smaller AXI write requests $320_1, \ldots, 320_{64}$ (i.e., 4 KB/64 B=64). Different write request data sizes and interconnect protocols are also supported.

FIG. 2C depicts smaller AXI write requests $320_1, \ldots, 320_N$ in accordance with an embodiment of the present disclosure.

Smaller AXI write request $320_1$ includes write address channel data $322_1$ transmitted over the write address (AW) channel, and write data channel data $324_1$ transmitted over the write data (W) channel. Write address channel data $322_1$ includes, inter alia, the original write address from data payload 314 (i.e., $AWAddr_1$) and an AWID signal set to 0, while the write data channel data $324_1$ includes the first 64 B of write data from data payload 314 (i.e., $WData_1$) and a WUser signal set to 0.

The next smaller AXI write request $320_2$ (not depicted for clarity) includes write address channel data $322_2$ transmitted over the write address (AW) channel, and write data channel data $324_2$ transmitted over the write data (W) channel. Write address channel data $322_2$ includes, inter alia, the original write address from data payload 314 (i.e., $AWAddr_2$) advanced by 64 bytes, and an AWID signal set to 0, while the write data channel data $324_2$ includes the second 64 B of write data from data payload 314 (i.e., $WData_2$) and a WUser signal set to 0. The smaller AXI write requests $320_3, \ldots, 320_{N-1}$ are similarly generated.

The last smaller AXI write request $320_N$ includes write address channel data $322_N$ transmitted over the write address (AW) channel, and write data channel data $324_N$ transmitted over the write data (W) channel. Write address channel data $322_N$ includes, inter alia, the original write address from data payload 314 (i.e., $AWAddr_N$) advanced by (N−1)·64 bytes, and an AWID signal set to 0, while the write data channel data $324_N$ includes the last 64 B of write data from data payload 314 (i.e., $WData_N$) and a WUser signal set to 0.

During the transmission through interconnect 100, the smaller AXI write requests 320 may become interleaved with one or more write requests from other RNs while traversing interconnect 100.

FIG. 2D depicts smaller AXI write requests $320_1, \ldots, 320_N$ interleaved with AXI write request 330, in accordance with an embodiment of the present disclosure.

Interleaved AXI write request 330 includes write address channel data 332 transmitted over the write address (AW) channel, and write data channel data 334 transmitted over the write data (W) channel. Write address channel data 332 includes, inter alia, a write address (i.e., AWAddr) and an AWID signal set to 1, while the write data channel data 334 includes write data (i.e., WData) and a WUser signal set to 0. The AWID signal differentiates the interleaved AXI write request 330 (i.e., AWID=1) from the smaller AXI write requests $320_1, \ldots, 320_N$ (i.e., AWID=0) during reassembly by destination PCIe/CXL controller 150.

HN-I 204 then transmits the smaller AXI write requests 320 to destination PCIe/CXL controller 150 over an AMBA connection with AXI protocol.

Destination PCIe/CXL controller 150 may simply convert each of the smaller AXI write requests 320 into a respective PCIe TLP packet 310, and then transmit the PCIe TLP packets 310 to destination PCIe device 152 (endpoint B) over the different PCIe network. Alternatively, destination PCIe/CXL controller 150 may reassemble the smaller AXI write requests $320_i$ into a single PCIe TLP packet 310 that includes one large write request, similar to the original PCIe TLP packet 310 with the original write request, and then transmit the single PCIe TLP packet 310 to destination PCIe device 152 (endpoint B). One reason for reassembling the smaller AXI write requests $320_i$ into a single PCIe TLP packet 310 at the destination PCIe/CXL controller 150 is to leverage the performance of the PCIe network.

For example, for PCIe, transmitting data using smaller (fragmented) transactions that have a data size of 64 B achieves a data transfer rate about 48 GB/s, while transmitting data using a single large transaction that has a data size of 4 KB achieves a data transfer rate about 60 GB/s, representing an increase in performance of about 25%. Above a data size of about 256 B, however, the data transfer rate remains essentially the same. For purposes of explanation, the size of the header is considered to be negligible.

Figure 2E:
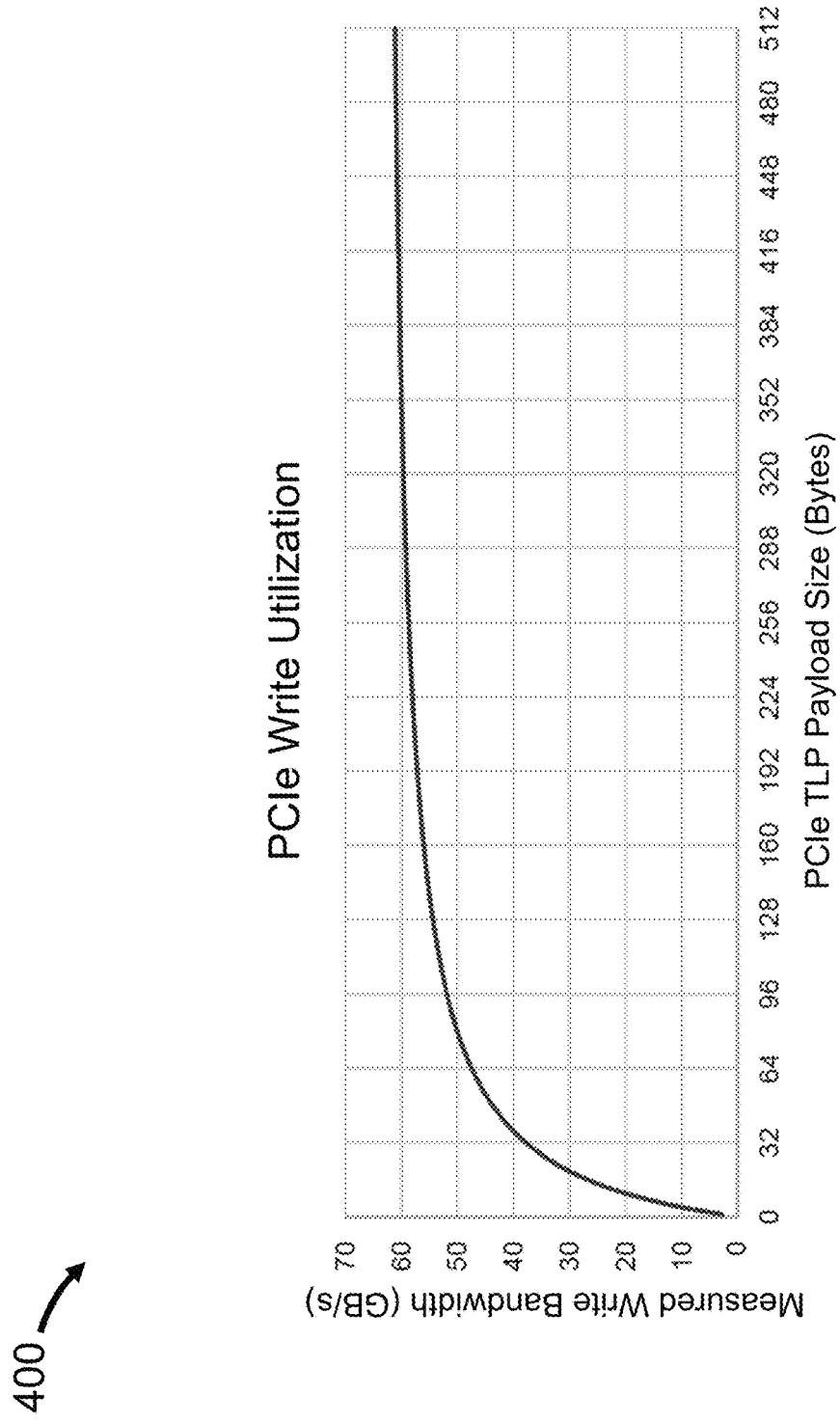
FIG. 2E depicts a PCIe write utilization graph.

FIG. 2E depicts PCIe write utilization graph 400 that presents measured write bandwidth (GB/s) vs. PCIe TLP payload size (Bytes).

Rather than reassemble the smaller AXI write requests $320_i$ with a small data size (e.g., 64 B) into a single PCIe TLP packet 310 with a large data size (e.g., 4 KB), which requires large-sized buffers, embodiments of the present disclosure advantageously divide or fragment the original write request into sequences of smaller AXI write requests $320_1, \ldots, 320_n$ that each satisfy the AMBA CHI protocol. The sequences of smaller AXI write requests $320_1, \ldots, 320_n$ are transmitted to HN-I 204 and then to destination PCIe/CXL controller 150, which reassembles each sequence of smaller AXI write requests $320_1, \ldots, 320_n$ into an intermediate (sized) PCIe TLP packet 310 with an intermediate data size (e.g., 256 B). Destination PCIe/CXL controller 150 then transmits the intermediate PCIe TLP packets 310 to destination PCIe device 152 (endpoint B) over the different PCIe network. Assembling the sequences of smaller AXI write requests into intermediate PCIe TLP packets advantageously maximizes efficiency by, inter alia, greatly reducing the buffer size required for reassembly (e.g., 256 B vs. 4 KB) and greatly reducing latency due to reassembly.

For example, if an original write request with a 4 KB data size was divided or fragmented into sixteen (16) sequences of four (4) smaller AXI write requests, each with a 64 B data size, reassembly of each sequence of 4 smaller AXI write requests into an intermediate write request with a 256 B data size advantageously provides the maximum data transfer rate of about 60 GB/s with about $\frac{1}{16}^{th}$ buffer size (i.e., 2566/4 KB=0.0625), reduced latency, etc.

Figure 3:
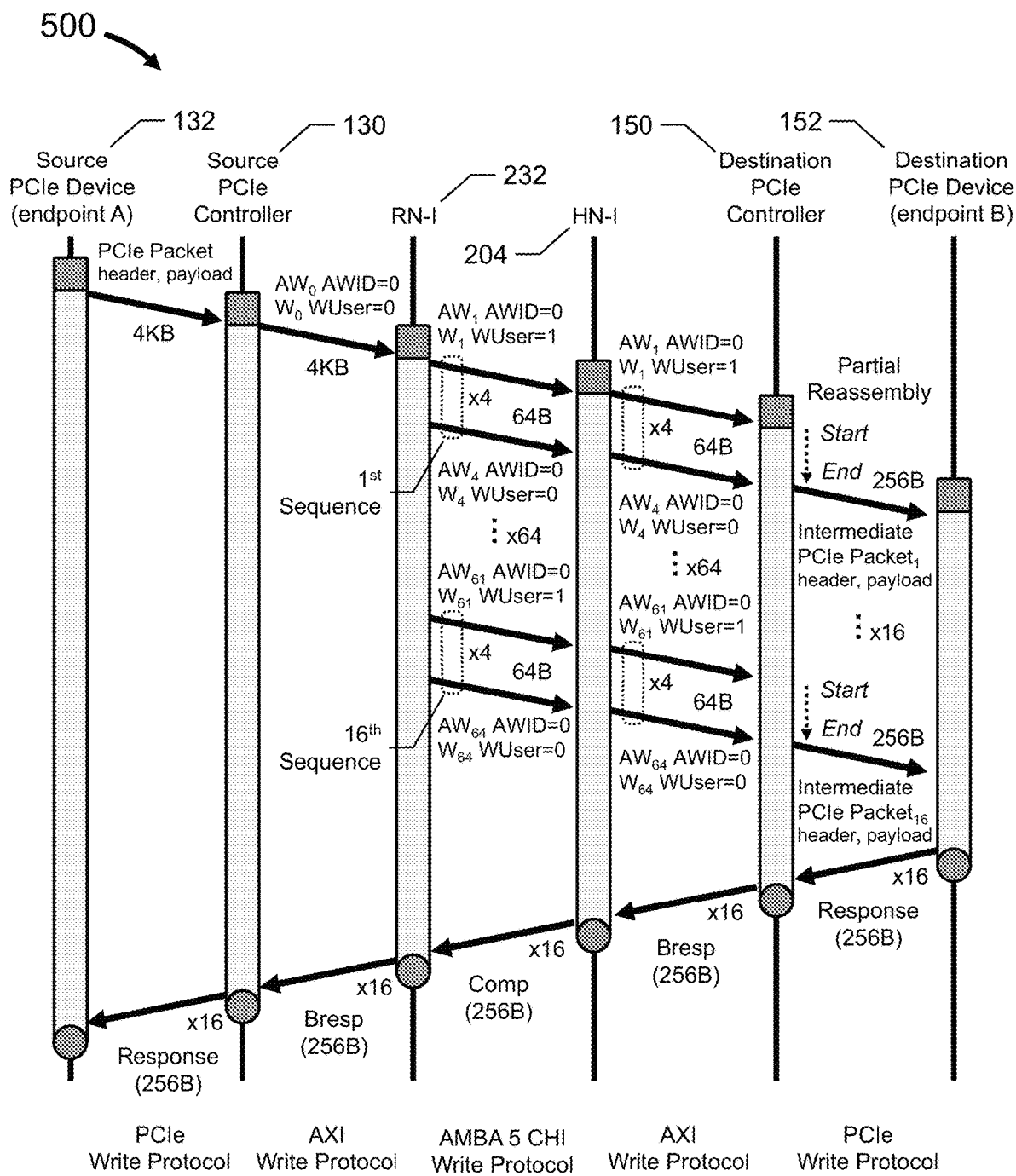
FIG. 3 depicts a protocol flow for the SoC depicted in FIGS. 1B and 1C, in accordance with an embodiment of the present disclosure.

FIG. 3 depicts a protocol flow 500 for SoC 10 depicted in FIGS. 1B and 1C, in accordance with an embodiment of the present disclosure.

Protocol flow 500 illustrates a write stream for PCIe peer-to-peer traffic flowing between PCIe endpoint A on source PCIe device 132 and PCIe endpoint B on destination PCIe device 152. The PCIe peer-to-peer traffic flows between source PCIe device 132 and source PCIe/CXL controller 130 through a PCIe connection, between source PCIe/CXL controller 130 and RN-I 232 through an AXI connection, between RN-I 232 and HN-I 204 through an AMBA CHI connection, between HN-I 204 and destination PCIe/CXL controller 150 through an AXI connection, and between destination PCIe/CXL controller 150 and destination PCIe device 152 through a PCIe connection. The protocol nodes are positioned along the horizontal axis, and time is indicated vertically, from top to bottom. The write requests are represented by arrows proceeding to the right, and the write responses are represented by arrows proceeding to the left.

Source PCIe device 132 (endpoint A) generates a PCIe TLP packet 310 that includes header 312 and data payload 314 with a write request that includes the write address and the write data, and then transmits the PCIe TLP packet 310 to source PCIe/CXL controller 130 over a PCIe network.

Source PCIe/CXL controller 130 converts the PCIe TLP packet 310 to an AXI write request 320 that is transmitted to interconnect 100, over the write address (AW) and write data (W) channels of the AXI connection, for processing by RN-I 232. The AXI write request 320 includes AW channel information identified as $AW_0$, and W channel information identified as $W_0$; the subscript "0" indicates that this AXI write request originated at source PCIe device 132 (endpoint A). $AW_0$ includes, inter alia, the $AWAddr_0$ signal (i.e., the write address) and the AWID signal (set to 0), and $W_0$ includes, inter alia, the $WData_0$ signal (i.e., the write data) and the $WUser_0$ signal (set to 0).

In this embodiment, the size of the write data is 4 KB, the amount of write data that can be transmitted over interconnect 100 in a single AXI write request is 64 B, and the size of the write data for each intermediate write request is 256 B. In other words, the data size for each smaller AXI write request data (i.e., 64 B) is smaller than the data size of the write request (i.e., 4 KB), and the data size for each intermediate write request (i.e., 256 B) is smaller than the data size of the write request and larger than the data size of each smaller AXI write request.

RN-I 232 receives and divides the AXI write request ($AW_0$ $W_0$) into 64 smaller AXI write requests, identified as $AW_1$ $W_1$, . . . , $AW_{64}$ $W_{64}$, and arranges them into 16 sequences, each sequence having 4 smaller AXI write requests. The AWID signal in each of the smaller AXI write requests is set to 0 to indicate that all of the smaller AXI write requests are derived from the AXI write request that originated at source PCIe device 132 (endpoint A). As discussed above, after the first smaller AXI write request ($AW_1$ $W_1$) is generated based on the AXI write request ($AW_0$ $W_0$), each subsequent smaller AXI write request has a write address that is advanced by 64 bytes, and a successive 64 B of write data.

In many embodiments, the sum of the data sizes of the smaller AXI write requests in the sequences of smaller AXI write requests equals the AXI write request data size. In other words, all of the write data from the AXI write request ($AW_0$ $W_0$) is divided among the sequences of smaller AXI write requests. In certain embodiments, each sequence of smaller AXI write requests includes the same number of smaller AXI write requests, each smaller AXI write request has the same data size, and each intermediate write request has the same data size. In other embodiments, at least one intermediate write request may have a different data size than the others.

The first sequence includes smaller AXI write requests $AW_1$ $W_1$, $AW_2$ $W_2$, $AW_3$ $W_3$ and $AW_4$ $W_4$. The WUser signal identifies the last smaller AXI request in the sequence and, as such, may be known as the last identifier. In this embodiment, the WUser signal is set to 1 for the first three smaller AXI write requests, i.e., $AW_1$ $W_1$, $AW_2$ $W_2$ and $AW_3$ $W_3$, and set to 0 for the last smaller AXI write requests, i.e., $AW_4$ $W_4$. Other last identifier values are also supported.

The second sequence includes smaller AXI write requests $AW_5$ $W_5$, $AW_6$ $W_6$, $AW_7$ $W_7$ and $AW_8$ $W_8$ (not depicted for clarity). The WUser signal is set to 1 for the first three smaller AXI write requests, i.e., $AW_5$ $W_5$, $AW_6$ $W_6$ and $AW_7$ $W_7$, and set to 0 for the last smaller AXI write requests, i.e., $AW_8$ $W_8$. And so on for the next 13 sequences of smaller AXI write requests.

The last ($16^{th}$) sequence includes smaller AXI write requests $AW_{61}$ $W_{61}$, $AW_{62}$ $W_{62}$, $AW_{63}$ $W_{63}$ and $AW_{64}$ $W_{64}$. The WUser signal is set to 1 for the first three smaller AXI write requests, i.e., $AW_{61}$ $W_{61}$, $AW_{62}$ $W_{62}$ and $AW_{63}$ $W_{63}$, and set to 0 for the last smaller AXI write requests, i.e., $AW_{64}$ $W_{64}$.

RN-I 232 then transmits the sequences of smaller AXI write requests $AW_1$ $W_1$, . . . , $AW_{64}$ $W_{64}$ across interconnect 100 to HN-I 204.

HN-I 204 transmits the sequences of smaller AXI write requests $AW_1$ $W_1$, . . . , $AW_{64}$ $W_{64}$, over the AW and W channels of the AXI connection, to destination PCIe/CXL controller 150.

Destination PCIe/CXL controller 150 assembles each sequence of smaller AXI write requests into an intermediate (sized) PCIe TLP packet, with an intermediate data size of 256 B, based on the WUser signal. For example, destination PCIe/CXL controller 150 assembles the first sequence of smaller AXI write requests, i.e., $AW_1$ $W_1$, $AW_2$ $W_2$, $AW_3$ $W_3$ and $AW_4$ $W_4$, into a first intermediate PCIe TLP $packet_1$ based on the WUser signal and the AWID signal. Destination PCIe/CXL controller 150 then transmits the intermediate PCIe TLP packets, i.e., intermediate PCIe TLP $packet_1$, . . . , intermediate PCIe TLP $packet_{16}$, to destination PCIe device 152 (endpoint B) over the PCIe network.

Destination PCIe device 152 (endpoint B) provides a response to each intermediate PCIe TLP packet that is received, and the responses are returned back through the transmission path to source PCIe device 132 (endpoint A), as generally depicted in FIG. 3. Destination PCIe device 152 (endpoint B) does not provide a response for posted write requests.

In other embodiments, rather than transmit the sequences of smaller AXI write requests to destination PCIe/CXL controller 150, HN-I 204 assembles each sequence of smaller AXI write requests into an intermediate (sized) PCIe TLP packet, with an intermediate data size of 256 B, based on the WUser signal. For example, HN-I 204 assembles the first sequence of smaller AXI write requests, i.e., $AW_1$ $W_1$, $AW_2$ $W_2$, $AW_3$ $W_3$ and $AW_4$ $W_4$, into a first intermediate PCIe TLP $packet_1$ based on the WUser signal and the AWID signal, then transmits the intermediate PCIe TLP packets, i.e., intermediate PCIe TLP $packet_1$, . . . , intermediate PCIe TLP $packet_{16}$, to destination PCIe/CXL controller 150, which forwards them to destination PCIe device 152 (endpoint B) over the PCIe network.

In many embodiments, if HN-I 204 receives an interleaved AXI write request, i.e., an AXI write request with an AWID signal different than 0, such as, for example, 1, 2, etc., before the last smaller AXI write request from the last sequence is received, HN-I 204 simply transmits the interleaved AXI write request to destination PCIe/CXL controller 150. Because destination PCIe/CXL controller 150 assembles each sequence into an intermediate PCIe TLP packet based on the WUser signal and the AWID signal, destination PCIe/CXL controller 150 will not include the interleaved AXI write request in any intermediate PCIe TLP packet that is based on an AWID signal that is 0. In other embodiments, the interleaved AXI write request may be buffered until the last intermediate write request has been transmitted.

In many embodiments, when interconnect 100 provides a common ID to fragments of a transaction, a first flag may be used to identify transactions originating from another source PCIe/CXL controller, and a second flag may be used to identify the last beat in the original write transaction.

In other embodiments, as an alternative to the first flag, transactions from another controller may be identified by matching the subset of the transaction ID used by interconnect 100 to route responses back to that controller. This may require that interconnect 100 use AXI IDs for this purpose, knowledge of the IDs used, programmable logic or software to match these IDs, and a mechanism to configure the programmable logic or software. As an alternative to the second flag, the transactions may be monitored for contiguous addresses and writes may be merged when observed, which advantageously works for all traffic except, perhaps, interleaved transactions.

In further embodiments, when the destination HSS controller has no free buffers when a smaller write request arrives, which may occur due to interleaving, for example, the data size of the intermediate write request may be dynamically reduced. For example, if the first smaller write request of a new intermediate write request, or a new smaller write request for an intermediate write request that is already being assembled, arrives and there is no buffer space, the destination HSS controller may send out the intermediate write request(s) that is currently being assembled. This ensures that assembly does not create latency outliers or system congestion due to backpressure.

In many embodiments, buffers may be allocated on receipt of the first smaller write request and overflow may be handled by either reporting an error, or by passing through the smaller write requests that cannot be assembled. The former is not transparent, and the latter may lead to a sudden decrease in performance, which limits aggressive minimization of buffer space.

Figure 4:
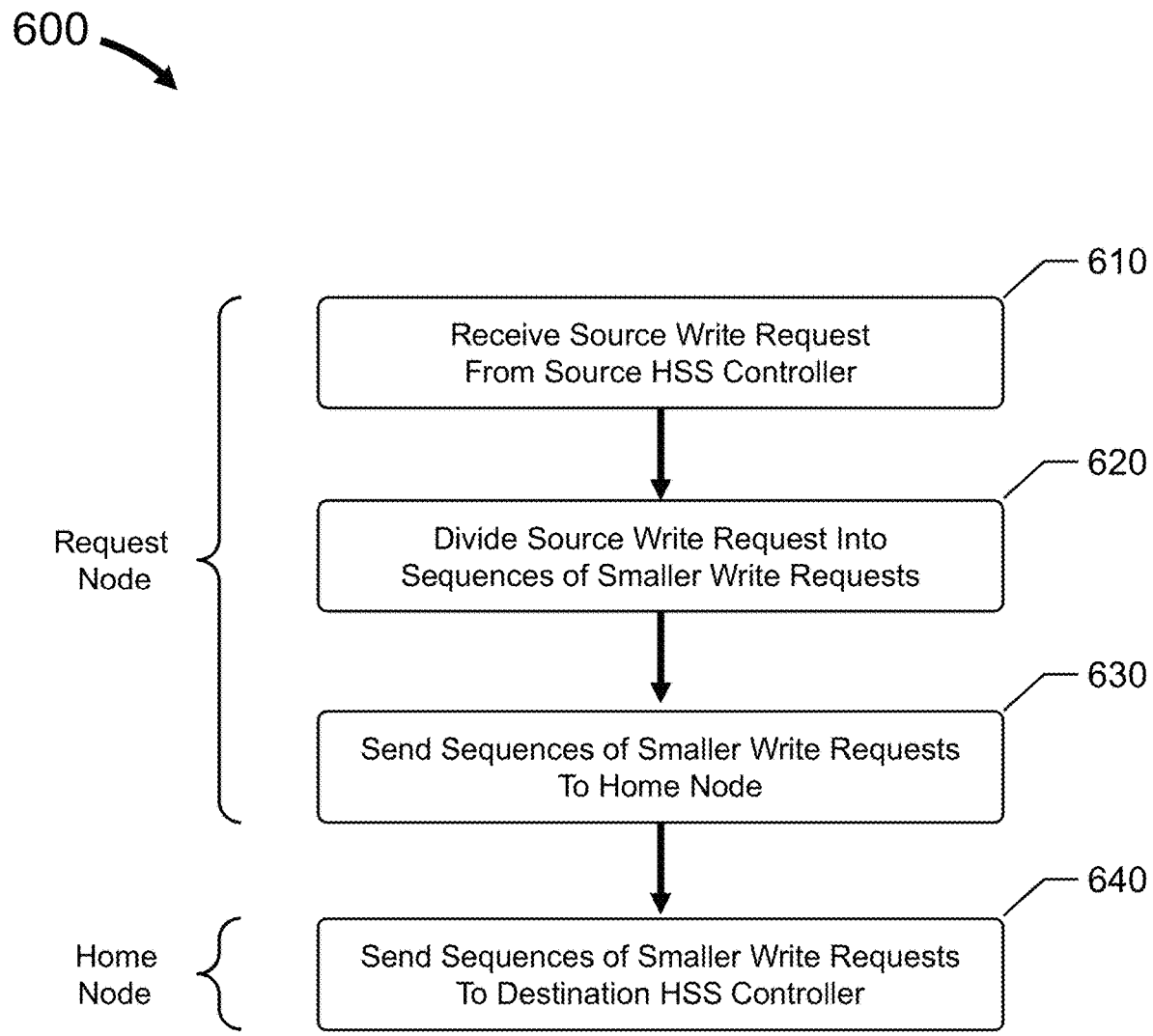
FIG. 4 depicts a flow diagram representing functionality for transferring data across an interconnect, in accordance with embodiments of the present disclosure.

FIG. 4 depicts a flow diagram 600 representing functionality for transferring data across an interconnect, in accordance with embodiments of the present disclosure.

The functionality at 610, 620 and 630 is performed at a request node of an interconnect, and at least a portion of the functionality at 640 is performed at a home node of the interconnect.

At 610, a write request from a source is received from a source HSS controller. The write request has a data size.

At 620, the write request is divided into sequences of smaller write requests. Each smaller write request has a last identifier and a data size.

At 630, the sequences of smaller write requests are sent to the home node.

At 640, the sequences of smaller write requests are sent to the destination HSS controller for assembly into intermediate write requests that are transmitted to a destination. Each sequence of smaller write requests is assembled into an intermediate write request based on the last identifier, and each intermediate write request has a data size.

The embodiments described above and summarized below are combinable.

In one embodiment, a system includes a destination high speed serial (HSS) controller including a processor configured to receive sequences of smaller write requests from an interconnect, where the sequences of smaller write requests are generated from a larger write request from a source, the larger write request has a data size, and each smaller write request has a last identifier and a data size. For each sequence of smaller write requests, the processor is configured to assemble, based on the last identifier, the smaller write requests into an intermediate write request having a data size, and send, to a destination, the intermediate write request.

In another embodiment of the system, each smaller write request data size is smaller than the write request data size; and each intermediate write request data size is smaller than the write request data size and larger than the smaller write request data size.

In another embodiment of the system, the last identifier identifies a last request in each sequence of smaller write requests.

In another embodiment of the system, generated includes when a smaller write request is not the last request in the sequence, setting the last identifier to a first value; and when the smaller write request is the last request in the sequence, setting the last identifier to a second value.

In another embodiment of the system, assemble includes, for each smaller write request in the sequence, add the smaller write request to the intermediate write request; and when the last identifier is the second value, complete the assemble.

In another embodiment of the system, the source is a peripheral component interconnect express (PCIe) endpoint coupled to a source PCIe controller, the destination HSS controller is a PCIe controller, and the destination is a PCIe endpoint.

In another embodiment of the system, the write request data size is 4 KB, the intermediate request data size is 256 B and the smaller write request data size is 64 B.

In another embodiment of the system, a sum of the data sizes of the smaller write requests in the sequences of smaller write requests equals the write request data size.

In another embodiment of the system, each sequence of smaller write requests includes a same number of smaller write requests, each smaller write request has a same data size, and each intermediate write request has a same data size.

In one embodiment, a computer-based method for transferring data across an interconnect includes, at a request node, receiving, from a source high speed serial (HSS) controller, a write request from a source, the write request having a data size, dividing the write request into sequences of smaller write requests, each smaller write request having a last identifier and a data size, and sending, to a home node, the sequences of smaller write requests; and, at the home node, sending, to a destination HSS controller, the sequences of smaller write requests for assembly into intermediate write requests that are transmitted to a destination, where each sequence of smaller write requests is assembled into an intermediate write request based on the last identifier, and each intermediate write request has a data size.

In another embodiment of the computer-based method, each smaller write request data size is smaller than the write request data size; and each intermediate write request data size is smaller than the write request data size and larger than the smaller write request data size.

In another embodiment of the computer-based method, the last identifier identifies a last request in each sequence of smaller write requests.

In another embodiment of the computer-based method, dividing includes when a smaller write request is not the last request in the sequence, setting the last identifier to a first value; and when the smaller write request is the last request in the sequence, setting the last identifier to a second value.

In another embodiment of the computer-based method, assembly includes, for each smaller write request in the sequence, adding the smaller write request to the intermediate write request; and when the last identifier is the second value, completing the assembling.

In another embodiment of the computer-based method, the source is a peripheral component interconnect express (PCIe) endpoint, the source HSS controller is a PCIe controller, the destination HSS controller is a PCIe controller, and the destination is a PCIe endpoint.

In another embodiment of the computer-based method, the write request data size is 4 KB, the intermediate request data size is 256 B and the smaller write request data size is 64 B.

In another embodiment of the computer-based method, a sum of the data sizes of the smaller write requests in the sequences of smaller write requests equals the write request data size.

In another embodiment of the computer-based method, each sequence of smaller write requests includes a same number of smaller write requests, each smaller write request has a same data size, and each intermediate write request has a same data size.

In another embodiment of the computer-based method, at least one intermediate write request has a different data size than at least one other intermediate write request.

In another embodiment, a computer-based method for transferring data across an interconnect includes at a request node, receiving, from a source high speed serial (HSS) controller, a write request from a source, the write request having a data size, dividing the write request into sequences of smaller write requests, each smaller write request having a last identifier and a data size, and sending, to a home node, the sequences of smaller write requests; and, at the home node, for each sequence of smaller write requests, assembling, based on the last identifier, the smaller write requests into an intermediate write request having a data size, and sending, to a destination HSS controller, the intermediate write request.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, the terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "many embodiment," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system, comprising:
   a destination high speed serial (HSS) controller including
     a processor configured to:
      receive sequences of smaller write requests from an interconnect, where the sequences of smaller write requests are generated from a larger write request from a source, the larger write request has a data size, and each smaller write request has a last identifier, and a data size smaller than the larger write request data size; and
      for each sequence of smaller write requests:
        assemble, based on the last identifier, the smaller write requests into an intermediate write request having a data size smaller than the larger write request data size and larger than the smaller write request data size, and send, to a destination, the intermediate write request.

2. The system according to claim 1, where the last identifier identifies a last request in each sequence of smaller write requests.

3. The system according to claim 2, where said generated includes:

when a smaller write request is not the last request in the sequence, setting the last identifier to a first value; and when the smaller write request is the last request in the sequence, setting the last identifier to a second value.

4. The system according to claim 3, where said assemble includes:

for each smaller write request in the sequence:
add the smaller write request to the intermediate write request; and
when the last identifier is the second value, complete said assemble.

5. The system according to claim 1, where the source is a peripheral component interconnect express (PCIe) endpoint coupled to a source PCIe controller, the destination HSS controller is a PCIe controller, and the destination is a PCIe endpoint.

6. The system according to claim 5, where the write request data size is 4 KB, the intermediate request data size is 256 B and the smaller write request data size is 64 B.

7. The system according to claim 1, where a sum of the data sizes of the smaller write requests in the sequences of smaller write requests equals the write request data size.

8. The system according to claim 1, where each sequence of smaller write requests includes a same number of smaller write requests, each smaller write request has a same data size, and each intermediate write request has a same data size.

9. A computer-based method for transferring data across an interconnect, comprising:

at a request node:
receiving, from a source high speed serial (HSS) controller, a write request from a source, the write request having a data size;
dividing the write request into sequences of smaller write requests, each smaller write request having a last identifier, and a data size smaller than the write request data size;
sending, to a home node, the sequences of smaller write requests; and at the home node:
sending, to a destination HSS controller, the sequences of smaller write requests for assembly into intermediate write requests that are transmitted to a destination, where each sequence of smaller write requests is assembled into an intermediate write request based on the last identifier, and each intermediate write request has a data size smaller than the write request data size and larger than the smaller write request data size.

10. The computer-based method according to claim 9, where the last identifier identifies a last request in each sequence of smaller write requests.

11. The computer-based method according to claim 10, where said dividing includes:

when a smaller write request is not the last request in the sequence, setting the last identifier to a first value; and when the smaller write request is the last request in the sequence, setting the last identifier to a second value.

12. The computer-based method according to claim 11, where said assembly includes:

for each smaller write request in the sequence:
adding the smaller write request to the intermediate write request; and
when the last identifier is the second value, completing said assembling.

13. The computer-based method according to claim 9, where the source is a peripheral component interconnect express (PCIe) endpoint, the source HSS controller is a PCIe controller, the destination HSS controller is a PCIe controller, and the destination is a PCIe endpoint.

14. The computer-based method according to claim 13, where the write request data size is 4 KB, the intermediate request data size is 256 B and the smaller write request data size is 64 B.

15. The computer-based method according to claim 9, where a sum of the data sizes of the smaller write requests in the sequences of smaller write requests equals the write request data size.

16. The computer-based method according to claim 9, where each sequence of smaller write requests includes a same number of smaller write requests, each smaller write request has a same data size, and each intermediate write request has a same data size.

17. The computer-based method according to claim 9, where at least one intermediate write request has a different data size than at least one other intermediate write request.

18. A computer-based method for transferring data across an interconnect, comprising:

at a request node:
receiving, from a source high speed serial (HSS) controller, a write request from a source, the write request having a data size;
dividing the write request into sequences of smaller write requests, each smaller write request having a last identifier and a data size smaller than the write request data size;
sending, to a home node, the sequences of smaller write requests;

at the home node:
for each sequence of smaller write requests:
assembling, based on the last identifier, the smaller write requests into an intermediate write request having a data size smaller than the write request data size and larger than the smaller write request data size; and
sending, to a destination HSS controller, the intermediate write request.

* * * * *